United States Patent [19]

Bazargan

[11] Patent Number: 4,623,215

[45] Date of Patent: Nov. 18, 1986

[54] HOLOGRAMS

[75] Inventor: Kaveh Bazargan, London, England

[73] Assignee: Satori Limited, London, England

[21] Appl. No.: 758,590

[22] Filed: Jul. 25, 1985

Related U.S. Application Data

[63] Continuation of Ser. No. 465,620, Feb. 10, 1983, abandoned.

[30] Foreign Application Priority Data

Feb. 15, 1982 [GB] United Kingdom ................. 8204401

[51] Int. Cl.⁴ ............................................. G03H 1/24
[52] U.S. Cl. ................................................. 350/3.85
[58] Field of Search ...................... 350/3.6, 3.75, 3.77, 350/3.83, 3.85, 3.86

[56] References Cited

U.S. PATENT DOCUMENTS

| 3,567,305 | 3/1971 | Collier et al. | 350/3.5 |
| 3,603,668 | 9/1971 | DeBitetio | 350/162 R |
| 3,623,798 | 11/1971 | Sheridon | 350/3.5 |
| 3,922,416 | 11/1975 | Ryan | 428/172 |
| 3,944,322 | 3/1976 | Benton | 350/3.5 |
| 4,217,405 | 8/1980 | Benton | 430/2 |
| 4,244,633 | 1/1981 | Kellie | 350/3.78 |

FOREIGN PATENT DOCUMENTS

| 1572767 | 2/1970 | Fed. Rep. of Germany . |
| 1546333 | 10/1968 | France . |
| 81/00918 | 4/1981 | PCT Int'l Appl. . |
| 1171448 | 11/1969 | United Kingdom . |
| 1205224 | 9/1970 | United Kingdom . |
| 1521958 | 8/1978 | United Kingdom . |
| 1566553 | 5/1980 | United Kingdom . |

OTHER PUBLICATIONS

Bell System Technical Journal, vol. 45, No. 10, article by C. B. Burckhardt.
Applied Optics, vol. 14, No. 12, article by T. Okoshi et al.

*Primary Examiner*—Bruce Y. Arnold
*Attorney, Agent, or Firm*—David W. Selesnick

[57] ABSTRACT

A hologram viewing apparatus, an integral direct viewing hologram device and an article useful in the manufacture of hologram devices are predicated upon a particular set of components grouped according to a number of permutations. The viewing apparatus comprises a screen consisting of at least a plane grating, the hologram device comprises a venetian blind film having a hologram embossed on or bonded onto one surface and a plane grating embossed on or bonded onto the other surface, and the article useful in the manufacture of hologram devices comprises a venetian blind film embossed on one side with a plane grating.

8 Claims, 2 Drawing Figures

HOLOGRAMS

This application is a continuation of application Ser. No. 465,620 filed Feb. 10, 1983, now abandoned.

BACKGROUND OF THE INVENTION

The present invention relates to the viewing of holograms. A particular application is the viewing of holograms in non-coherent light.

A proposal for white light display of a hologram is to be found in an article "Display of Holograms in White Light", C. B. Burckhardt, Bell Systems Technical Journal, December 1966. pages 1841–4. A hologram is illuminated from behind. In front of the hologram is a venetian blind and a plane grating whose pitch corresponds to an interference pattern formed by light beams at the same angle as the mean angle between the subject beam and the reference beam used in making the hologram. Thus the average fringe spacial frequency of the hologram is equal to that of the grating. The slats of the venetian blind are at such an angle that they block direct light but allow through the first order diffracted light. This will be subject to severe colour dispersion but the second diffraction by the plane grating compensates for this so that the viewer sees a monochrome three-dimensional image behind the hologram, provided that the viewing and illuminating angles are correct.

In spite of this proposal in 1966 and increasing interest in holograms practical white light holograms displaying full parallax have not become readily available. Nor has it been possible to provide simple, direct viewing multi-colour holograms.

SUMMARY OF THE INVENTION

This invention is predicated upon a particular set of components which may be grouped according to a number of permutations each of which has a specific application. The disadvantages and limitations encountered in the prior art can be mitigated and new and useful devices produced.

According to a first aspect of the present invention there is provided a hologram viewing apparatus comprising a housing enclosing a light source which illuminates a screen located in or on a wall of the housing, the screen consisting of at least a plane grating.

According to a second aspect of the present invention there is provided an integral direct viewing hologram device comprising a venetian blind film having a hologram embossed on or bonded onto one surface and a plane grating embossed on or bonded onto the other surface.

According to a third aspect of the present invention there is provided an article useful in the manufacture of hologram devices, comprising a venetian blind film embossed or bonded on one side with a plane grating.

The viewing apparatus provides a particularly simple and self-contained unit the screen of which comprises at least one of the components necessary to form the direct viewing hologram device of the invention. The hologram devices themselves when intended for use with the viewing apparatus can be formed without the component or components provided by the screen of the the viewing apparatus. The cost of manufacturing the holograms can therefore be significantly reduced while the cost of including the plane grating does not significantly affect the cost of the viewing apparatus. It is also possible to include the venetian blind film as part of the viewing apparatus thus enhancing the advantageous appropriation of cost between viewing apparatus and hologram devices.

The hologram device of the invention is an integral structure which can be handled freely and which can be manufactured cheaply, particularly in large numbers.

The direct viewing hologram device of this invention differs from the proposal of 1966 by the provision of a venetian blind film in place of the mechanical slats and by the fact that the hologram device of this invention is an integral structure. A major point of distinction between the hologram device of this invention and the previous proposal is the embossing or bonding of the hologram onto a venetian blind film. Provision of the plane grating by embossing or bonding onto the venetian blind film further enhances the distinctive nature and utility of the hologram device of this invention.

Venetian blind film is available as "light control film" from Minnesota Mining and Manufacturing Company with opaque "slats" or "louvres" in the film itself at a pitch of approximately 10 per millimeter and at various slat angles. A convenient angle for the purpose of this invention is 45° and a convenient view angle, as specified by the manufacturers, is 60°.

In general it is possible to use either thin film or thick film holograms, the former being provided, for example, by embossing and the latter being provided photographically with subsequent bonding of that photographic film to the venetian blind film. The plane grating may also be embossed or, if, for example, it is in the form of a photographic film, bonded onto the venetian blind film.

The venetian blind film embossed on one side with a plane grating can be combined with holograms so as to form direct viewing hologram devices.

In order to provide multi-coloured images, the invention further provides a hologram device wherein there are two or more holograms made in different coloured light and provided on the said one surface of the venetian blind film. In this development of the invention it is preferable to use thick film holograms because of their selectivity to the colour of light in which they were made. In general, saturation increases with hologram thickness. On the other hand the grating is preferably thin.

In this invention, it is preferred to utilize image plane holograms because of their greater image sharpness. Two-step or lens techniques for forming image plane holograms are well known.

BRIEF DESCRIPTION OF THE DRAWINGS

Embodiments of the invention will now be described by way of example only and with reference to the accompanying drawings, in which.

DESCRIPTION OF THE PREFERRED EMBODIMENTS

Figure 1:
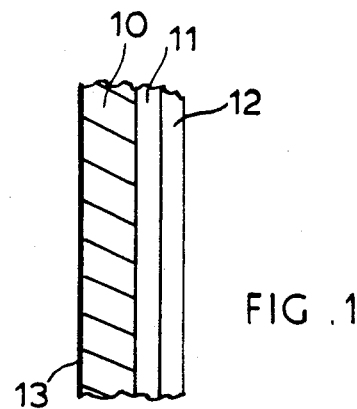
FIG. 1 shows a hologram device embodying one aspect of the invention.

Referring to FIG. 1, a venetian blind film 10 has two thick holograms 11 and 12 bonded in face-to-face relationship with each other and bonded onto one surface of the film 10. A plane grating 13 is bonded or embossed on the other side of the venetian blind film 10. The holograms 11 and 12 are made in different coloured light, for example blue and red respectively, and with different mean angles between object and reference beams such that the average fringe spacial frequencies of the holograms are all equal and equal to that of the grating. The device can be viewed from either side, the image remaining orthoscopic. For a monochrome image, the film 12 can be omitted and the hologram film 11 can be made in any colour coherent light. The film 11 can be replaced by a hologram embossed on the surface of the venetian blind film 10.

Methods for forming embossed holograms are known. A method of forming an embossed hologram suitable for producing a multi-colour image may comprise the following steps:

forming an interference fringe pattern in a first group of areas on a photographic medium using a first coherent light source, producing a further interference fringe pattern on a second group of areas on the photographic medium, displaced from and distinct from the first group of areas, using a coherent light source of different wavelength from the first, processing the photographic medium so that the fringe patterns are recorded as regions of varying optical density, providing a positive photoresist layer on the processed photographic medium, exposing the combination so as to provide a latent image of the fringe patterns in the photoresist layer and processing the photoresist layer so as to provide a surface relief hologram.

When using this method it is believed that optimum results are obtained by selecting the reference angle between the object and reference beams for each light source so as to ensure that the average spatial frequency of each of the fringe patterns is equal to the spatial frequency of the plane grating with which the hologram is associated.

A multi-colour image may be reconstructed from such a hologram using white light which passes through a multi-colour mask, the mask being in registration with the hologram such that a given colour in the mask is adjacent the portions of the hologram corresponding to that colour.

If different reference angles are selected as described then dispersed white light should be used to reconstruct the final image. Without the use of different reference angles for each light source the separate colour images tend not to register with each other thus degrading the multicolour reconstructed image. Dispersed white light is provided by the plane grating of the viewing device.

In the above description the number of coherent light sources, and corresponding groups of areas can be greater than two, if appropriate.

A surface relief hologram of this form can be used to form a master which may be pressed into the surface of polymeric sheets so as to provide inexpensive replicas of the holograms.

Figure 2:
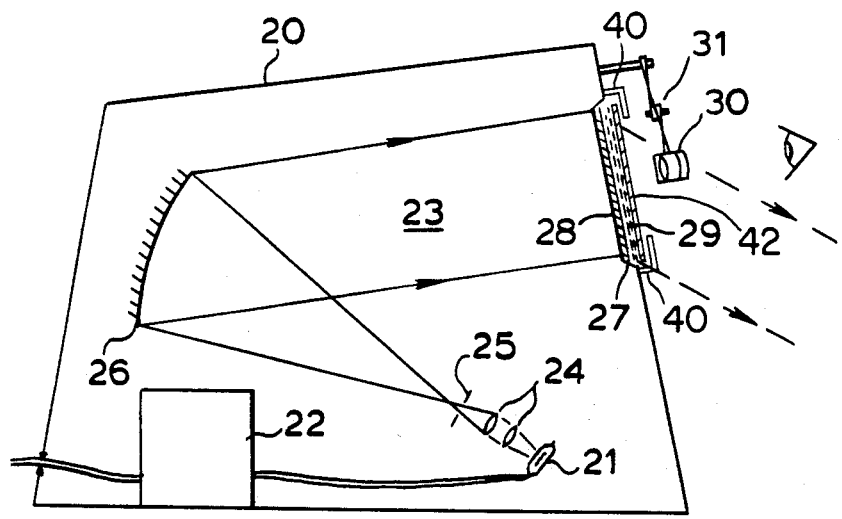
FIG. 2 shows a hologram viewing apparatus in sketchmatic section.

FIG. 2 illustrates an apparatus for use in viewing holograms. The apparatus comprises an opaque housing 20 enclosing a lamp 21 which may be in the form of a quartz-halogen lamp fed by a power supply unit 22. Light from the lamp 21 is collimated into a beam 23 by an optical system including lenses 24, a diaphragm 25 and a concave mirror 26. The light beam 23 illuminates the back of the viewing screen which is provided in a wall of the housing. The screen consists of at least a plane diffraction grating 28 but preferably also includes a venetian blind film 27, as shown. The diffraction grating 28 is placed against, bonded or embossed on the rear surface of the venetian blind film 27.

It will be appreciated that the viewing apparatus of FIG. 2 provides the plane grating and venetian blind film required by the above described hologram device. Consequently, when intended for use with the viewing apparatus of FIG. 2 the hologram devices need only comprise an embossed or thick film hologram. The manufacturing cost of each hologram device is therefore significantly reduced while the manufacturing cost of including the diffraction grating and venetian blind film in the viewing apparatus is relatively insignificant.

In the absence of a hologram, the screen appears dark. A hologram 29 can be placed over the screen, clips or guides 40 being provided to form holding means for holding the hologram in place. Provided that the hologram is appropriately made to match the grating, an image appears and may be viewed.

With the use of a light source having an exceptionally fine filament, parts of the optical system within the housing 20 may be dispensed with. It is conceivable that some applications may benefit from a slightly convergent rather than collimated illuminating beam.

In order to enable the image to be examined in detail, a magnifier 30 may be mounted on a linkage 31 which allows the magnifier to be moved freely to any screen position while maintaining an orientation such that the total dispersion is minimized.

The viewing apparatus is considered to be particularly beneficial for its practical utility and can be adapted for specific applications. One such application is to emulate a microscope and this application presents commercial advantages for use as an educational, research or other aid.

The housing of the viewing apparatus is formed so as to have an external configuration similar to that of a conventional microscope. The holograms to be used with this viewing apparatus are prepared with exposure to illumination from the objective lens of a microscope which is focused on the required sample. In the viewing apparatus the reconstructed holographic image simulates the intermediate microscope image. The viewing apparatus includes an appropriate conventional eyepiece and consequently the final image seen using the viewing apparatus very closely resembles that seen using a conventional microscope. The apparatus will function in a similar manner to a conventional microscope with the microscope slide replaced with a hologram. This is particularly advantageous where the article to be viewed is difficult or expensive to obtain or maintain. The holograms can be of the embossed form so that they can be rapidly and cheaply mass-produced. The image produced by the hologram retains microscopic information.

If the above described process for forming a multicoloured surface relief hologram is employed then the mask or filters required for reproducing the image can be incorporated within the viewing apparatus of FIG. 2 or, alternately, can be inluded in the hologram device of FIG. 1.

It has been found that the light that is diffracted by the grating but which remains undiffracted by the hologram emanates from the scren at angles causing possibly undesirable illumination outside the viewing apparatus. This potential disadvantage may be overcome by the provision of an additional layer of venetian blind film 42. The additional venetian blind film should have slats extending perpendicularly to the surfaces of the film with the slats being continuous along the width of the film. This additional film must be placed between the hologram and the person viewing the reconstructed image and the film is therefore secured in a spaced apart face to face relationship with the front of the screen. The hologram to be viewed is inserted between the screen and the additional venetian blind film.

The additional venetian blind film could be added to the described hologram device.

The invention further provides an article useful in the manufacture of hologram devices. This article is a venetian blind film embossed or bonded on one side with a plane grating. Additionally, if the article is to be used in forming multicoloured holograms it may be possible to include the required mask or filters as part of the article.

What I claim is:

1. A hologram viewing apparatus comprising a housing having a window in the form of a diffraction grating in combination with a venetian blind film, a light source within the housing for illuminating the window from behind, and hologram holding means associated with the housing for holding a hologram adjacent the outside of the window for viewing the hologram by looking into the housing.

2. The invention of claim 1 wherein the grating is embossed onto the venetian blind film.

3. The invention of claim 1 in combination with an embossed hologram supported by the holding means.

4. The invention of claim 3 wherein the apparatus includes a multicolor mask in registration with the hologram such that a given color in the mask is adjacent portions of the hologram corresponding to that color.

5. The invention of claim 1 in combination with a thick film hologram supported by the holding means.

6. The invention of claim 1 wherein the housing has an eyepiece external the housing for viewing the hologram.

7. The invention of claim 1 further including a hologram device supported by the holding means and a venetian blind film external the hologram device with slats extending perpendicular the surface of the film along the width of the film.

8. The invention of claim 1 wherein the venetian blind film is on the outside of the diffraction grating.

* * * * *